US011962975B2

(12) United States Patent
Yan et al.

(10) Patent No.: US 11,962,975 B2
(45) Date of Patent: Apr. 16, 2024

(54) AUDIO DEVICE

(71) Applicant: Shenzhen SHOKZ Co., Ltd., Shenzhen (CN)

(72) Inventors: Bingyan Yan, Shenzhen (CN); Fengyun Liao, Shenzhen (CN); Xin Qi, Shenzhen (CN)

(73) Assignee: Shenzhen SHOKZ Co., Ltd., Shenzhen (CN)

( * ) Notice: Subject to any disclaimer, the term of this patent is extended or adjusted under 35 U.S.C. 154(b) by 375 days.

(21) Appl. No.: 17/342,381

(22) Filed: Jun. 8, 2021

(65) Prior Publication Data

US 2021/0297790 A1 Sep. 23, 2021

Related U.S. Application Data

(63) Continuation of application No. PCT/CN2019/110430, filed on Oct. 10, 2019.

(51) Int. Cl.

*H04R 1/40* (2006.01)
*H04R 3/00* (2006.01)
*H04R 25/00* (2006.01)

(52) U.S. Cl.

CPC ........... *H04R 25/407* (2013.01); *H04R 3/005* (2013.01); *H04R 2430/03* (2013.01)

(58) Field of Classification Search

CPC .... H04R 1/406; H04R 25/405; H04R 25/407; H04R 2460/01

See application file for complete search history.

(56) References Cited

U.S. PATENT DOCUMENTS

| | | | | |
|---|---|---|---|---|
| 4,633,498 A * | 12/1986 | Warnke | H04R 5/0335 381/26 |
| 6,714,654 B2 * | 3/2004 | Lichtblau | H04R 25/407 381/322 |
| 7,564,979 B2 * | 7/2009 | Swartz | H04R 5/04 381/60 |

(Continued)

FOREIGN PATENT DOCUMENTS

| | | |
|---|---|---|
| CN | 1113627 A | 12/1995 |
| CN | 101595452 A | 12/2009 |

(Continued)

OTHER PUBLICATIONS

International Search Report of PCT/CN2019/110430 (dated Jun. 29, 2020).

*Primary Examiner* — Ryan Robinson
(74) *Attorney, Agent, or Firm* — FIDELI LAW PLLC

(57) ABSTRACT

The present application discloses an audio device that has an inhibitory effect on sound waves emitted by a near-field sound source within a specified range and has an amplification effect on sound waves emitted from a far-field sound source outside the specified range. The audio device includes a first sound wave sensor to receive a sound wave and output a first signal based on the sound wave; a second sound wave sensor to receive the sound wave and output a second signal based on the sound wave; and a signal processing circuit coupled to the first sound wave sensor and the second sound wave sensor to generate an output signal based on the first signal and the second signal, wherein the audio device's near-field sensitivity to a sound wave is substantially lower than its far-field sensitivity to the sound wave.

19 Claims, 7 Drawing Sheets

(56) References Cited

U.S. PATENT DOCUMENTS

| | | | | |
|---|---|---|---|---|
| 8,180,067 | B2 * | 5/2012 | Soulodre | H04R 3/005 381/94.3 |
| 8,682,675 | B2 * | 3/2014 | Togami | H04R 3/005 381/313 |
| 9,025,782 | B2 * | 5/2015 | Visser | H04R 5/033 381/23.1 |
| 9,202,456 | B2 * | 12/2015 | Lee | G10K 11/17837 |
| 10,708,702 | B2 * | 7/2020 | Yuzuriha | H04R 29/005 |
| 10,885,907 | B2 * | 1/2021 | Ebenezer | H04R 3/005 |
| 11,304,014 | B2 | 4/2022 | Pedersen et al. | |
| 11,405,732 | B2 * | 8/2022 | Honda | H04R 25/40 |
| 11,729,557 | B2 * | 8/2023 | Petersen | H04R 25/505 381/318 |
| 2006/0269074 | A1 * | 11/2006 | Oxford | H04M 1/6033 381/59 |
| 2009/0060222 | A1 | 3/2009 | Jeong et al. | |
| 2011/0044460 | A1 | 2/2011 | Rung | |
| 2011/0170705 | A1 | 7/2011 | Kanamori | |
| 2013/0142355 | A1 | 6/2013 | Isaac et al. | |
| 2013/0142356 | A1 | 6/2013 | Isaac et al. | |
| 2018/0146307 | A1 | 5/2018 | Petersen et al. | |
| 2019/0208334 | A1 | 7/2019 | Petersen et al. | |
| 2022/0345814 | A1 * | 10/2022 | Lee | H04R 1/46 |
| 2022/0408180 | A1 * | 12/2022 | Lepoutre | G01S 5/22 |

FOREIGN PATENT DOCUMENTS

| | | | | |
|---|---|---|---|---|
| CN | 102077607 | A | 5/2011 | |
| CN | 103702258 | A | 4/2014 | |
| CN | 104041073 | A | 9/2014 | |
| CN | 104168529 | A | 11/2014 | |
| CN | 104427454 | A | 3/2015 | |
| CN | 108630220 | A | 10/2018 | |
| EP | 1830348 | A1 * | 9/2007 | G10L 21/0208 |
| JP | 63-82197 | A | 4/1988 | |
| JP | 63082197 | A | 4/1988 | |
| JP | 04090298 | A | 3/1992 | |
| JP | 04175099 | A | 6/1992 | |
| JP | 2007-028610 | A | 2/2007 | |
| JP | 2007028610 | A | 2/2007 | |
| JP | 2007300513 | A | 11/2007 | |
| JP | 2016-171569 | A | 9/2016 | |
| JP | 2016171569 | A | 9/2016 | |
| JP | 2017-535204 | A | 11/2017 | |
| JP | 2017535204 | A | 11/2017 | |
| JP | 2019-075598 | A | 5/2019 | |
| KR | 1020000047688 | A | 7/2000 | |
| KR | 1020130010193 | A | 1/2013 | |
| KR | 1020140089580 | A | 7/2014 | |
| RU | 2159099 | C1 | 11/2000 | |
| RU | 2434262 | C2 | 11/2011 | |
| WO | 2012161781 | A1 | 11/2012 | |
| WO | 2016/078233 | A1 | 5/2016 | |
| WO | 2018089549 | A1 | 5/2018 | |

* cited by examiner

AUDIO DEVICE

RELATED APPLICATIONS

This application is a continuation application of PCT application No. PCT/CN2019/110430, filed on Oct. 10, 2019, and the content of which is incorporated herein by reference in its entirety.

TECHNICAL FIELD

The present invention relates to the field of sound collection devices, and more particularly to an audio device for sound transmission.

BACKGROUND

For an audio device having a sound transmitting function, such as a microphone module, the requirements for sound transmission of a near-field sound source and a far-field sound source differ in different scenarios. For example, during phone calls, people usually want to enhance the sound closer to the mobile phone, and weaken the sound of surrounding environment, so that the other party of the phone call can clearly hear the caller's voice. On the contrary, in some other scenarios, it is desirable to reduce the sensitivity of the audio device to a near-field sound source and increase its sensitivity to a far-field sound source.

For example, in the field of hearing aids, the requirements for hearing aids are no longer limited to simply letting a user hear a sound, but to make the user to clearly hear and understand talks of the surrounding people. One of the key factors affecting voice recognizability is the ratio of target voice-to-interference sound in a voice signal. The lower proportion of the interference sound in the voice signal, the higher the recognizability of the target voice in the voice signal.

However, the amplification effect of the conventional hearing aid is not selective, and thus it amplifies the target voice (far-field sound source) as well as the user's own voice (near-field sound source). Generally speaking, when a user wear a hearing aid, since the user's own voice comes closer to the hearing aid than that of a person talking to the user, the intensity of the user's voice received by the hearing aid will be stronger than that of the person talking to the user. Therefore, the user's own voice signal will become noise to interfere with the target voice, reducing the recognizability of the target voice, and thereby negatively affecting the communication and user experience of the hearing aid.

Therefore, there is a need of a new audio device having a sound transmitting function that amplifies the far-field sound source signal while suppressing the near-field sound source signal.

SUMMARY

A brief summary of the present application is set forth below to provide a basic understanding of certain aspects of the application. It is understood that this section is not intended to identify essential or critical parts of the application and is not intended to limit the scope of the application. The purpose of this section is merely to present introduction of some concepts of the present application. More details will be disclosed elsewhere in the present application.

The present application provide an audio device for sound transmission, including a first sound wave sensor to receive a sound wave and output a first signal based on the sound wave; a second sound wave sensor to receive the sound wave and output a second signal based on the sound wave; and a signal processing circuit coupled to the first sound wave sensor and the second sound wave sensor to generate an output signal based on the first signal and the second signal, wherein a target near-field sensitivity of the audio device to a target near-field sound wave emitted by a target near-field sound source is substantially lower than a far-field sensitivity of the audio device to a far-field sound wave emitted by a far-field sound source, and wherein a second target distance of the target near-field sound source from the first sound wave sensor is shorter than a first target distance of the far-field sound source from the first sound wave sensor.

In some embodiments, the target near-field sensitivity being substantially lower than the far-field sensitivity is that a ratio of the target near-field sensitivity to the far-field sensitivity is lower than a predetermined value.

In some embodiments, the first sound wave sensor includes a first microphone; the second sound wave sensor includes a second microphone; and a distance from the first microphone to the second microphone is a predetermined distance.

In some embodiments, the target near-field sound source is positioned such that an absolute value of a sound pressure amplitude gradient of the target near-field sound wave between the first microphone and the second microphone is greater than a first sound pressure threshold; and the target far-field should source is positioned such that an absolute value of a sound pressure amplitude gradient between a sound pressure amplitude of the target far-field sound wave between the first microphone and the second microphone is less than a second sound pressure threshold.

In some embodiments, the audio device further includes an electronic device, wherein the first sound wave sensor and the second sound wave sensor are mounted on the electronic device, and when the electronic device is in operation, a position of the target near-field sound source has a fixed relationship with a spatial pose of the electronic device, the first sound wave sensor is at a first distance from a position of the target near-field sound source, and the second sound wave sensor is at a second distance from the position of the target near-field sound source.

In some embodiments, a sensitivity of the first sound wave sensor is a first sensitivity, a sensitivity of the second sound wave sensor is a second sensitivity, and the first sensitivity and the second sensitivity are determined according to a ratio of the first distance to the second distance.

In some embodiments, a sensitivity of the first sound wave sensor is a first sensitivity, a sensitivity of the second sound wave sensor is a second sensitivity, and the first sensitivity is equal to the second sensitivity.

In some embodiments, the second sound wave sensor further includes an amplitude adjustment circuit configured to perform an amplitude adjustment on an initial second signal output by the second sound wave sensor according to a ratio of the first distance to the second distance to generate the second signal.

In some embodiments, the electronic device includes an adapting button configured to activate the amplitude adjustment circuit when pressed.

In some embodiments, when the audio device is in operation, a value of amplitude adjustment of the amplitude adjustment circuit changes in real time according to dynamic changes of the first distance and the second distance.

In some embodiments, the first sound wave sensor includes a phase adjustment circuit configured to perform a phase adjustment on an initial first signal output by the first sound wave sensor according to a difference between the first distance and the second distance to generate the first signal.

In some embodiments, the signal processing circuit includes a differential circuit.

In some embodiments, the audio device further includes a signal amplifying circuit to amplify an output signal of the differential circuit to generate an output signal of the audio device.

In some embodiments, a preset distance between the second sound wave sensor and the first sound wave sensor is adjustable.

In some embodiments, the electronic device includes a head mounted electronic device.

In some embodiments, the head mounted electronic device includes a hearing aid, and the hearing aid includes at least one earplug, at least part of the first sound wave sensor and at least part of the second sound wave sensor are disposed in the at least one earplug.

In some embodiments, each of the at least one earplug includes at least one signal converter, the at least one signal converter each is configured to receive the output signal from the signal processing circuit and output a sound signal transmitted through air.

In some embodiments, the at least one earplug each includes at least one signal converter, the at least one signal converter each is configured to receive the output signal from the signal processing circuit and output a bone-conducted sound signal.

In some embodiments, the electronic device includes a speaker, and the position of the target near-field sound source is a mounting position of the speaker.

In some embodiments, the first signal includes n first sub-signals, the second signal includes n second sub-signals, wherein the ith first sub-signal and the ith second sub-signal correspond to the same frequency band, wherein n is a positive integer greater than 1, and i is any integer from 1 to n; and the signal processing circuit processes each pair of the first sub-signal and the second sub-signal having the same order number and then synthesizes the output signal.

BRIEF DESCRIPTION OF THE DRAWINGS

The following figures describe in detail the exemplary embodiments disclosed in this application. The same reference numerals shown in different figures in the drawings may indicate similar structures. Those of ordinary skill in the art will understand that these embodiments are non-limiting exemplary embodiments. The accompanying drawings are only for the purpose of illustration and description, and are not intended to limit the scope of the present disclosure. Other embodiments may also accomplish the objects of the present application. Further, it should be understood that the drawings are not drawn to scale.

DETAILED DESCRIPTION

The present application discloses an audio device having a sound transmitting function that has an inhibitory effect on sound waves emitted by a near-field sound source within a specified range, and has an amplification effect on sound waves emitted from a far-field sound source other than the specified near-field sound source.

The following description provides specific application scenarios and requirements of the present application in order to enable those skilled in the art to make and use the present application. In view of the following description, these and other features of the present disclosure, as well as the operation and function of the related elements of the structure, and the economics of the combination and manufacture of the components, may be substantially improved. All of these form part of the disclosure with reference to the drawings. It is to be understood, however, that the drawings are not intended. Various modifications to the disclosed embodiments will be apparent to those skilled in the art. The general principles defined herein may be applied to other embodiments and applications without departing from the spirit and scope of the disclosure. Therefore, the present disclosure is not limited to the embodiments shown, but the broadest scope consistent with the claims.

Figure 1:
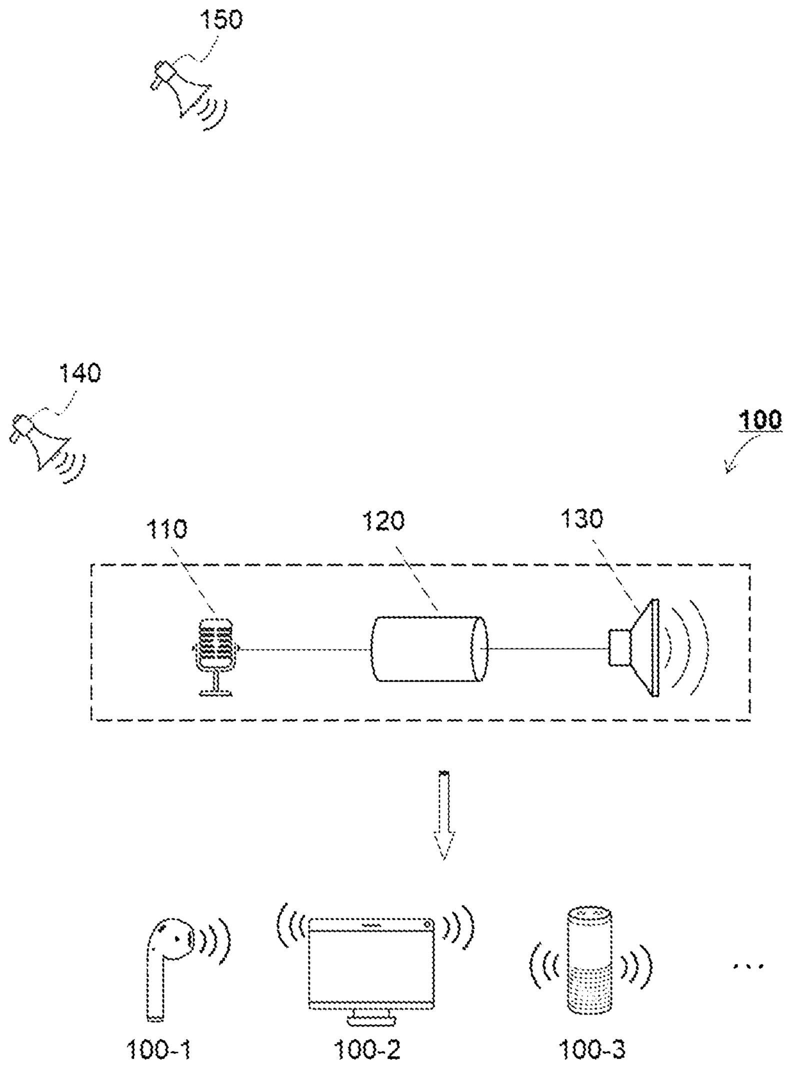
FIG. 1 shows application scenarios of an audio device having a sound transmitting function according to some embodiments of the present application.

FIG. 1 shows application scenarios of an audio device 100 according to some embodiments of the present application. The audio device 100 may include one or more of a sound wave sensor 110, a signal processing circuit 120, and a signal converter 120. For example, the sound wave sensor 110 may be one or more microphone sets; the signal converter 130 may be a speaker of a particular function; the signal processing circuit 120 may include one or more electrical components, circuits, and/or hardware modules. The one or more electrical components, circuits, and/or hardware modules may process the signals produced by the sound wave sensor 110 and then pass the processed signals to the signal converter 120 for conversion to sound.

The audio device 100 may include the sound wave sensor 110 alone. For example, the audio device may be one or more microphone sets. The acoustic device 100 may also include a sound wave sensor 110, a signal processing circuit 120, and a signal converter 120. For example, the audio device 100 may be an electronic device provided with a microphone set(s). The device 110 may include any device that has a sound collection function. For example, the electronic device may include, but is not limited to, a hearing aid 100-1, a smart television 100-2, and a smart stereo device 100-3, as well as other smart audio devices. These smart audio devices 100 can perform specific operations by collecting sounds from the surrounding environment and recognizing a specific sound from the ambient sounds. For example, a smart television 100-2 and a smart speaker 100-3 may execute instructions and/or programs stored therein through recognizing human voices, and then identifying the commands contained in the human voices. For example, a smart speaker 113 may receive a user's voice, recognize a command of playing a song from the user's voice, and then play the corresponding song.

In another example, the smart audio device 100 may have a special sensitivity to the sound from a particular location, i.e., being particularly sensitive on in sensitive to the sound from that particular location. In some embodiments, the sound wave sensor 110 mounted on the device 100 may respond at different sensitivities to sound sources from different distances. In FIG. 1, a near-field sound source 140 is closer to device 110 than far-field sound source 150. Both the sound emitted from the near-field sound source 140 and the sound emitted from the far-field sound source 150 may be collected and/or detected by the audio device 100 and converted into electrical signals. There, the sensitivity of the audio device 100 to a sound signal may refer to the ratio of the power of the output electrical signal to the power of the sound received by the audio device 100. The greater the sensitivity is, the greater the power of the electrical signal converted by the audio device 100 from a sound source of unit power. In some embodiments of the present application, when the near-field sound source 140 and the far-field sound source 150 emit sounds simultaneously, the sounds may be received and/or detected by the audio device 100, and the sensitivity of the audio device 100 to the far-field sound source 150 may be substantially higher than its sensitivity to the near-field sound source 140. This may mean that if the sounds emitted from the near-field sound source 140 and the far-field sound source 150 are of the same power when they arrive at the audio device 100, the power of the electrical signals converted from the far-field sound source 150 may be substantially greater than the power of the electrical signals converted from the near-field sound source 140. Therefore, if the respective sensitivities to the near-field sound source 140 and the far-field sound source 150 are appropriately set, the audio device 100 may achieve the purpose of suppressing sounds from the near-field sound source while amplifying sounds from the far-field sound source.

When the audio device 100 is mounted on a hearing aid 100-1, the near-field sound source 140 may be the vocal cord of a user who is wearing the hearing aid 100-1, and the position of the near-field sound source 140 may be the position of the vocal cord of the user; the far-field sound source 150 may be an ambient (e.g., environmental) sound source around the user, for example, the vocal cord of another person next to the user. In this scenario, the hearing aid user's own voice will be suppressed by the audio device 100, and the ambient sound source, including another person's voice, will be enhanced by the audio device 100. Thus, the hearing aid user may find it easier to hear the ambient sounds including another person's voice.

Figure 2:
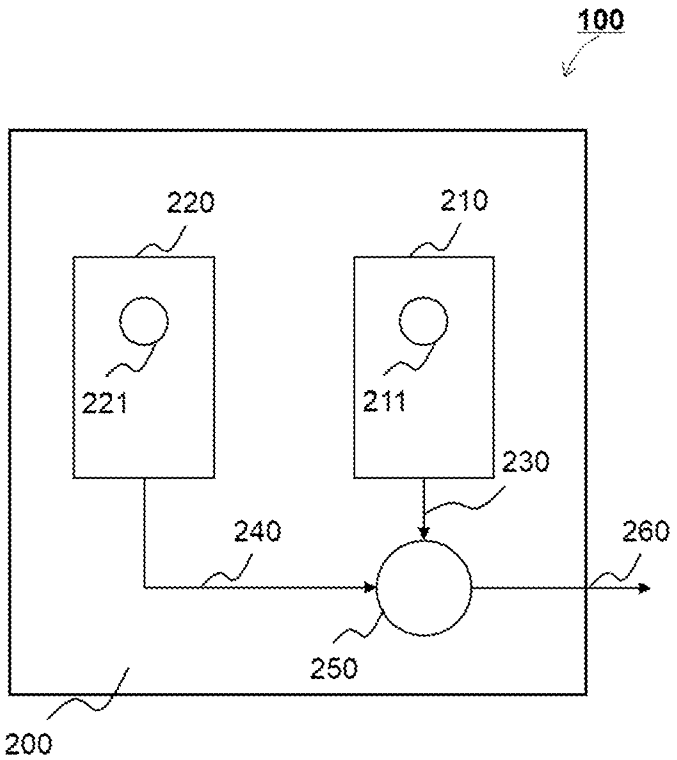
FIG. 2 is a schematic diagram of an audio device having a sound transmitting function according to some embodiments of the present application.

FIG. 2 is a schematic diagram of the audio device 100 according to some embodiments of the present application. The audio device 100 may include a base 200. The base 200 may carry various components of the audio device 100. The base 200 may carry the components of the audio device 100. The base 200 may be mounted on the audio device 110 and connected to other components of the audio device 110 via one or more interfaces (not shown). The one or more interfaces may be configured to supply power to, conduct data interaction and signal input/output, or the like. For example, the audio device 100 may include an external power source for power supply, or it may be equipped with an internal power supply. For another example, the audio device may collect sound signals and then output electrical signals which may be transmitted to other components of the device 100 via the one or more interfaces for subsequent processing.

A first sound wave sensor module 210 and the second sound wave sensor module 220 may be fixedly mounted on the base 200. The first sound wave sensor module 210 may include a first sound wave sensor 211 (an array formed by one or more sound wave sensors). In some embodiments, the first sound wave sensor module 210 may also include additional circuit components, such as power amplification circuits and the like, which are electrically connected to the first sound wave sensor module 210. The first sound wave sensor 211 may be configured to receive sound waves and generate first initial signals. The additional circuit components may receive and process the first initial signals into first signals. The first sound wave sensor module 210 may then output the first signals according to the first initial signals. The first initial signals and the first signals are both electrical signals. When the first sound wave sensor module 210 does not include additional circuit components other than the first sound wave sensor 211, the first signals are the first initial signal. When the first sound wave sensor module 210 further includes additional circuit components, such as the power amplification circuits, the first signals may be signals processed from the first initial signals by the additional circuit components.

The second sound wave sensor module 220 may have the same or similar structure as the first sound wave sensor module 210. For example, the second sound wave sensor module 220 may include a second sound wave sensor 221 to receive the sound wave and output a second initial signal. Like the first sound wave sensor module 210, the second sound wave sensor module 220 may also include additional circuit components to receive the second initial signals and further process the second initial signals into second signals. The additional circuit components may include, but are not limited to, power amplifying circuits and the like.

In some embodiments, the first sound wave sensor 211 may include at least one microphone, referred to as a first microphone; the second sound wave sensor 221 may include at least one microphone, referred to as a second microphone. The first microphone and the second microphone may be configured to receive, sense, and/or collect sound waves and convert the sound waves into electrical signals.

The first sound wave sensor 211 and the second sound wave sensor 221 may be mounted on the base 200, being separated by a distance. In some embodiments, the distance between the two sensors may be fixed at a first preset value, that is, at a preset distance. Alternatively, the distance between the first sound wave sensor 211 and the second sound wave sensor 221 may be adjustable.

The audio device 100 may further include a signal processing circuit 250. The signal processing circuit 250 may also be mounted on the base 200. In some embodiments of the present application, the signal processing circuit 250 may be configured to receive the first signals from the first sound wave sensor module 210 and the second signals from the second sound wave sensor module 220. The signal processing circuit 250 may then generate output signals of the audio device 100 using the first signals and second signals, and then output the output signals. To this end, the first signals from the first sound wave sensor module 210 may be transmitted to the signal processing circuit 250 through the circuit 230, and the second signals from the second sound wave sensor module 220 may be transmitted to the signal processing circuit 250 through the circuit 240. The signal processing circuit 250 may output the output signals to the outside through the circuit 260, for example, to other components of the device 110 through an interface.

When a plurality of sound sources emits sounds in the surrounding environment of the audio device 100, the first sound wave sensor 211 and the second sound wave sensor 221 may receive the sounds from the plurality of sound sources. For example, the plurality of sound sources may include the target near-field sound wave emitted by a target near-field sound source and the target far-field sound wave emitted by a target far-field sound source. For example, the target near-field sound source may be the vocal cord of the hearing aid user, that is, the near-field sound source, and the target near-field sound wave may be the sound emitted from the hearing aid user; the target far-field sound source may be one or more speakers other than the hearing aid user, that is, the far-field sound source, and the target far-field sound wave may be the sound emitted by the one or more speakers other than the hearing aid user. Correspondingly, after receiving the sounds emitted from one or more sound sources, the first sound wave sensor module 210 and the second sound wave sensor module 220 may output the first signals and the second signals, respectively. In order to describe the audio device 100 disclosed in the present application, an assumption is made in the following description that the target near-field sound wave emitted from the target near-field sound source and the target far-field sound wave emitted from the target far-field sound source are identical in their spectra. In addition, their intensities transmitted to the first sound wave sensor 211 are also the same.

The first signals and the second signals may contain information of one or more sound sources. After processed by the signal processing circuit 250, in the output signal of the audio device 100, the signal intensity corresponding to the target near-field sound wave may be substantially lower than the signal intensity corresponding to the target far-field sound wave. For example, in the case where the audio device 100 is the hearing aid 100-1, the vocal cord of the hearing aid user may be the target near-field sound source, and the vocal cords of other speakers may be the target far-field sound source. In this case, the amplification for the voice of the hearing aid user is significantly lower than that for other speakers. Compared with the target far-field sound source, the target near-field sound source is closer to the audio device 100. Hence, the target near-field sound source is also referred to as a near-field sound source, and the target far-field sound source is also referred to as a far-field sound source. In some embodiments, the sound source within a predetermined range around the first sound wave sensor 211 may be a target near-field sound source, and the sound source outside the predetermined range may be a target far-field sound source. Take the hearing aid as an example, the predetermined range may be a range of distance from the user's vocal cord to the hearing aid, and the predetermined range may also be a range between the two ears of the user. For example, the predetermined range may be a hemisphere on one side of the hearing aid facing the ear with a radius of 10 cm, 11 cm, 12 cm, 13 cm, 14 cm, 15 cm, 16 cm, 17 cm, 18 cm, 19 cm, 20 cm, 21 cm, 22 cm, 23 cm, 24 cm, or 25 cm. The predetermined range may be the distance between the two ears of the user. For example, it may be the range between the user's two ears. That is to say, in the case of a hearing aid, the near field distance is approximately the position of the user's head or the vocal cord relative to the hearing aid.

Accordingly, the target near-field sound source is within the predetermined range, while target far-field sound source is outside of the predetermined range. The distance ("first target distance") from the target far-field sound source to the audio device 100 is longer than the distance ("second target distance") from the target near-field sound source to the audio device 100. For example, the first target distance may refer to the distance between the target far-field sound source and the first sound wave sensor; the second target distance may refer to the distance between the target near-field sound source and first sound wave sensor.

In some embodiments, the signal processing circuit 250 may include a differential circuit. The first signals and the second signals may be converted to the output signals after passing through the differential circuit. The differential circuit may enable the sensitivity of the audio device 100 to the target near-field sound wave of the target near-field sound source substantially lower than that to the target far-field sound wave of the target far-field sound source. For example, a ratio between the sensitivity of the audio device 100 to the target far-field sound wave and its sensitivity to the target near-field sound wave may be greater than a threshold. For example, the threshold may be of a value of 2, 3, 4, 5, 6, 7, 8, 9, 10 and the like. See FIG. 3 and its associated description for a detailed description of the mechanism of the audio device 100.

Figure 3:
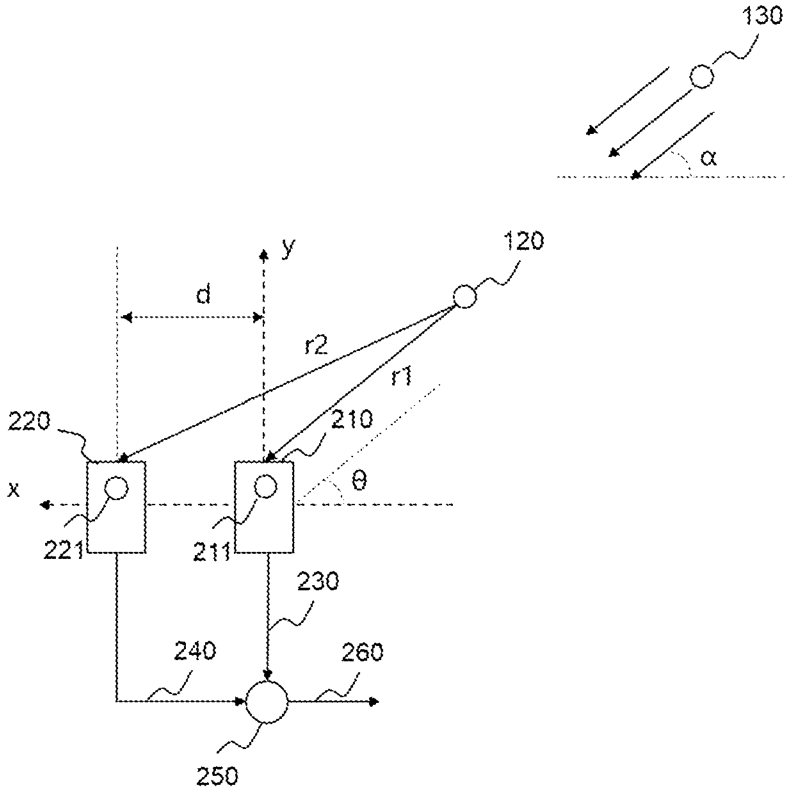
FIG. 3 is a schematic diagram the showing near-field sound suppression effect of an audio device having a sound transmitting function according to some embodiments of the present application.

FIG. 3 is a schematic diagram showing near-field sound suppression mechanism of the audio device according to some embodiments of the present application. In FIG. 3, the spacing and/or distance between the first sound wave sensor 211 and the second sound wave sensor 221 is d. For sound waves emitted from the same sound source, there will be an amplitude difference and a phase difference between the sound wave transmitted to the first sound wave sensor 211 and the sound wave transmitted to the second sound wave sensor 221.

The target far-field sound source is located outside the predetermined range, in other words, the target far-field sound source 150 is sufficiently gar away from the two sensors, that is, R>>d, where R represents the distance of the target far-field sound source 150 from the audio device 100. Accordingly, compared with the target near-field sound wave emitted by the target near-field sound source 140, the wave surface of target far-field sound wave of the target far-field sound source 150 when it reaches the audio device 100 is closer to a plane. As a result, the amplitude of sound pressure of the target far-field sound at the first sound wave sensor 211 and that at the second sound wave sensor 221 are similar or identical.

In some embodiments, the location of target near-field sound source 140 may need to satisfy a first constraint condition, and the location of the target far-field sound source 150 may need to satisfy a second constraint condition. The absolute value of the gradient of sound pressure amplitude of the target near-field sound wave emitted by the target near-field sound source 140 between the first sound wave sensor 211 and the second sound wave sensor 221 greater than a first sound pressure threshold. The second constraint condition may be that the absolute value of the gradient of sound pressure amplitude of the target far-field sound wave emitted by the target far-field sound source 150 between the first sound wave sensor 211 and the second sound wave sensor 221 is less than a second sound pressure threshold.

The sound pressure amplitude gradient is positively correlated with the distance between the sound source and the measurement point, and the position of the near-field sound source needs to be determined empirically according to the specific application scenario and the desired result. Therefore, the sound pressure threshold may have a one-to-one correspondence with the near-field sound source and the far-field sound source according to the definition of the distance therebetween.

The target near-field sound source 140 may be located within a predetermined range and may be closer to the audio device 100 than the target far-field sound source 150. Compared with the target far-field sound wave emitted by the target far-field sound source 150, the target near-field sound wave emitted by the target near-field sound source 140 is closer to a spherical surface when it reaches the audio device 100. As a result, its sound pressure amplitude may attenuate faster with the transmission of the target near-field sound wave. Herein, it is assumed that the sound pressure at target far-field sound source 150 or the target near-field sound source 140 is Ps, the sound pressure formed at the first sound wave sensor 211 is $P_1$, and the sound pressure formed at the second sound wave sensor 221 is $P_2$. The angle between the target near-field sound source 140 and the first sound wave sensor 211 is θ, where the angle θ is defined as the angle between an axis pointing from the second sensor array to the first sensor array and a vector pointing from the target near-field sound source 140 to the first sound wave sensor 211. Under a similar definition, the angle between target far-field sound source 150 and the first sound wave sensor 211 is α. The distance from the target near-field sound source 140 to the first sound wave sensor 211 is $r_1$, and its distance to the second sound wave sensor 221 is $r_2$. The distance from the target far-field sound source 150 to the first sound wave sensor 211 is R. then:

The sound pressure amplitude of the target far-field sound source 150 at the two sensor arrays may be expressed as:

$$P_1 = P_2 = \frac{P_S}{R}$$

The amplitude of the sound pressure of the target near-field sound source 140 at the two sensor arrays may be expressed as:

$$P_1 = \frac{P_S}{r_1},\ P_2 = \frac{P_S}{r_2}.$$

When reaching the two sensor arrays, the phase differences of the target far-field sound wave and the target near-field sound wave are related to the angular frequency ω of the sound source signal and the distance d between the two sensor arrays. Set the speed of sound to be c, then:

The phase difference of the target far-field sound wave between the two sensor arrays is:

$$\Phi = \frac{\omega}{o} * d * \cos\alpha;$$

and

The phase difference of the target near-field sound wave between the two sensor arrays is:

$$\Phi = \frac{\omega}{c} * (r_1 - r_2).$$

Accordingly, the lower the frequency of the target near-field sound source 140 or the target far-field sound source 150, the smaller or more negligible the phase difference of the target near-field sound wave or target far-field sound wave at the two sensor arrays. When the audio device 100 is mounted on the hearing aid 100-1, the target near-field sound source 140 may be the hearing aid user's vocal cord. A typical male adult has a base frequency from 85 to 180 Hz, and that of a typical female adult is from 165 to 255 Hz. Because the frequency of human voice is relatively low, the phase difference of the sound waves of human voice at the two sensor arrays is also small or even negligible.

In some embodiments, the sensitivities of the first sound wave sensor 211 and the second sound wave sensor 221 may be the same (for a sensor array, the sensitivity thereof represents a ratio of the power amplitude of the electrical signal output from it to the power amplitude of the sound signal received by it). The first sound wave sensor 211 and the second sound wave sensor 221 may respectively convert the target near-field sound wave into two independent electrical signals. Because the amplitudes of the target near-field sound wave at the first sound wave sensor 211 may differ from that at the second sound wave sensor 221, without considering the phase difference thereof, the amplitudes of the two electrical signals may also be different.

In the embodiments shown in FIG. 3, the target near-field sound source 140 is closer to the first sound wave sensor 211, therefore the target near-field sound wave is close to a spherical wave between the first sound wave sensor 211 and the second sound wave sensor 221. Accordingly, the amplitude (or intensity) of the corresponding first initial signals outputted by the first sound wave sensor 211 may be larger than the amplitude of the corresponding second initial signals output by the second sound wave sensor 221. If the first sound wave sensor module 210 and the second sound wave sensor module 220 do not include other circuit components, the first initial signals are the first signals, and the second initial signals are the second signals. The first signals and the second signals may then be sent to the signal processing circuit 250. If the signal processing circuit block 250 includes a differential circuit, the differential circuit may determine a difference between the first signals and the second signals. The difference between the first signals and the second signals may be output as the output signals corresponds to the target near-field sound wave.

Compare to the target near-field sound source 140, the target far-field sound source 150 is farther away from the first sound wave sensor 211, therefore the target far-field sound wave is close to a plane wave between the first sound wave sensor 211 and the second sound wave sensor 221. Accordingly, after the target far-field sound wave emitted from the target far-field sound source 150 is received and/or detected and/or collected by the audio device 100, the amplitudes of its sound pressures at the first sound wave sensor 211 and the second sound wave sensor 221 may be close to each other or substantially the same. Accordingly, when the first signals and the second signals are sent to the differential circuit, they may be eliminated or substantially eliminated.

One of the objects of the present application is to suppress the intensity of the output signal corresponding to the target near-field sound source 140 and meanwhile enhance the intensity of the output signal corresponding to the target far-field sound source 150. Therefore, the first sound wave sensor module 210 and/or the second sound wave sensor module 220 may be adjusted so that when the audio device 100 responds to the target near-field sound wave, the amplitudes of the first signal and the second signal are close enough. After being processed by the differential circuit, the first signal and the second signal may substantially cancel each other, and the output signal may be significantly attenuated or even eliminated. At the same time, when the audio device 100 responds to the target far-field sound wave, since the first sound wave sensor module 210 and/or the second sound wave sensor module 220 are adjusted, the difference in the amplitudes of the first signal(s) and the second signal(s) may be increased, so that the intensity of the corresponding output signal may be enhanced after being processed by the differential circuit. The circuit configuration of the audio device 100 may be adjusted to achieve this object in the following embodiments.

In some embodiments, adjusting the circuit configuration of the audio device 100 may include adjusting the sensitivity of the first sound wave sensor module 210 and/or the second sound wave sensor module 220. For example, in FIG. 3, by enhancing the sensitivity of the second sound wave sensor module 220, the audio device 100 may be adjusted to respond to the target near-field sound wave in such a way that the amplitudes of the first signals and the second signals may be the same or substantially the same. Accordingly, the first signals and the second signals may cancel or substantially cancel each other in the differential circuit, thereby eliminating or substantially eliminating the output signals.

It should be appreciated that enhancing the sensitivity of the second sound wave sensor module 220 is only one of the means of adjusting circuit configuration of the audio device 100. When the target near-field sound source 140 is located on the left side of the audio device 100 as shown in FIG. 3, the same outcome as above may also be achieved by lowering the sensitivity of the second sound wave sensor module 220. Similarly, the same purpose may also be achieved by simultaneously adjusting the sensitivity of the first sound wave sensor module 210 and the second sound wave sensor module 220, for example, by enhancing the sensitivity of first sound wave sensor module 210 and reducing the sensitivity of the second sound wave sensor module 220, etc.

In the case of enhancing the sensitivity of the second sound wave sensor module 220, when the audio device 100 responds to the target far-field sound wave, the corresponding second signals are enhanced, the difference between the first signals and the second signals may be increased. Accordingly, when the differential circuit processes the first and second signals, the output signal may get enhanced.

The adjustment to the sensitivity of the second sound wave sensor module 220 may be represented by a coefficient B. In the scenario shown in FIG. 3, the coefficient B may represent the degree of enhancement to the second sound wave sensor module 220. In the case where the first sound wave sensor 211 and the second sound wave sensor 221 have the same sensitivity, the audio device 100 responds to the target near-field sound source 140 as the following: the amplitude of the first signals and the amplitude of the second signals are the same when B=. Accordingly, the output signal is zero after the first signals and second signals are processed by the differential circuit, thereby the audio device 100 has a better suppression effect to sounds emitted from a near-field sound source. In an application environment similar to the hearing aid 100-1, the audio device 100 is assembled on the device 110, the relative spatial position of the device 110 is fixed with respect to the target near-field sound source 140 (for example, the relative spatial position between the human vocal cord and the hearing aid 100-1 is fixed). Therefore, the values of $r_1$ and $r_2$ may be predetermined, and the coefficient B may also be determined accordingly. If $$B = \frac{r_2}{r_1},$$

the audio device 100 will completely eliminate output signals corresponding to the target near-field sound wave, that is, the hearing aid 100-1 has no output in response to the user's own voice. But sometimes it is helpful to properly retain the hearing aid's own voice and so the user can hear his or her own voice. In this case, the response output of the hearing aid 100-1 to the target near-field sound wave may be controlled by adjusting the value of B in the vicinity of $$\frac{r_2}{r_1}$$

The case of completely eliminating the output signal corresponding to the target near-field sound wave will be used as an example to explain the operation mechanism of the audio device 100. If the target near-field sound source 140 or the target far-field sound source 150 is S(ω), the wave number thereof is $$k = \frac{\omega}{c},$$

then the audio device's 100 output signals $J_{output}$ (the output response to the target near-field sound source 140) and $Y_{output}$ (the output response to the target far-field sound source 150) may be expressed as:

a) When the audio device 100 responds to the target near-field sound wave: The first initial signal of the first sound wave sensor 211 is:

$$x_1 = \frac{S(\omega)}{r_1} * e^{-jkr_1},$$

the first signals are equal to the first initial signal, where k is the wave number; The second initial signal of the second sound wave sensor 221 is:

$$x_2 = \frac{S(\omega)}{r_2} * e^{-jkr_2},$$

the second signals is the second initial signal multiplied by the coefficient B:

$$x_2' = B * \frac{S(\omega)}{r_2} * e^{-jkr_2};$$

The output signals of the first signals and the second signals after the differential circuit are:

$$J_{output} = \left|\frac{S(\omega)}{r_1} * e^{-jkr_1}\ B * \frac{S(\omega)}{r_2} * e^{-jkr_2}\right| \tag{1}$$

b) When the audio device 100 responds to the target far-field sound wave: The first initial signals of the first sound wave sensor 211 is:

$$x_1 = \frac{S(\omega)}{R} * e^{-jkR},$$

the first signals are equal to the first initial signal, wherein k is the wave number. The second initial signal of the second sound wave sensor 221 is:

$$x_2 = \frac{S(\omega)}{R} * e^{-jkR} * e^{jw\frac{d*\cos\alpha}{c}},$$

the second signal is equal to the second initial signal multiplied by the coefficient B. The output signals of the first signals and the second signals after the differential circuit are:

$$Y_{output} = \left|\frac{S(\omega)}{R} * e^{-jkR} * \left(1 - B * e^{-jw\frac{d*\cos\alpha}{c}}\right)\right|; \tag{2}$$

It may be seen from the above derivation analysis that when the frequency of the sound source signal is low, by adjusting the coefficient B, the amplitudes of the first signals of the first sound wave sensor module 210 and the amplitudes of the second sound wave sensor module 220 in response to the target near-field sound wave may be identical or substantially identical. Therefore, the amplitude of the output signal corresponding to the target near-field sound wave may be zero or substantially close to zero. On the other hand, the amplitudes of the first signals of the first sound wave sensor module 210 and the amplitudes of second sound wave sensor module 220 in response to the target far-field sound wave may have a larger difference. Therefore, the amplitude of the output signal corresponding to the target far-field sound wave may be a non-zero value. Accordingly, the sensitivity of the audio device 100 to the target near-field sound wave generated by the target near-field sound source 140 may be substantially lower than the sensitivity to the target far-field sound wave emitted from the target far-field sound source 150.

In some embodiments, the coefficient B may be adjustable within a predetermined adjustment range. When the coefficient B is adjusted within this range, the sensitivity of the audio device 100 to the target near-field sound wave generated by the target near-field sound source 140 may be substantially lower than the sensitivity to the target far-field sound wave emitted from the target far-field sound source 150. The sensitivity of the sound wave may be specifically expressed as follows: for the target near-field sound wave with a power of $A_0$ at the target near-field sound source 140, the corresponding power of the first signals is $B_1$, and the corresponding power of the second signals is $B_2$; for the target far-field sound wave having a power of $A_0'$ at the target far-field sound source 150, the corresponding power of the first signals is $B_1'$ and a corresponding power of the second signals is $B_2'$. When the coefficient B is adjusted within the predetermined adjustment range, $(A_0'|\beta_1-B_2|)/(A_0|B_1'-B_2|)$ is smaller than the signal threshold. The signal threshold may be preset to indicate the degree of suppression to the target near-field sound wave by the audio device 100.

Various methods may be used to adjust the coefficient B. One method may be adjusting the sensitivity of the first sound wave sensor 211 and/or the sensitivity of the second sound wave sensor 221 (assuming that the original sensitivities of these two sensors arrays are the same). When the first sound wave sensor module 210 and the second sound wave sensor module 220 do not include other circuit components than the first sound wave sensor 211 and the second sound wave sensor 221, the first initial signal would be the first signals, and the second initial signal would be the second signals. Taking FIG. 3 as an example, increasing the sensitivity of the second sound wave sensor 221 may increase the amplitude of the second signals; whereas, increasing of the sensitivity of the second sound wave sensor 221 may depend on the predetermined adjustment range of the coefficient B. For example, when the aim of the audio device 100 is to completely suppress the signal from the target near-field sound source 140, the value of the coefficient B may be set as $$\frac{r_2}{r_1}.$$

The sensitivity of the second sound wave sensor 221 may be adjusted such that the amplitude of the second signals output by the second sound wave sensor module 220 is equal to the amplitude before adjustment multiplied by the coefficient B. This adjustment of the coefficient B may be applied to calibrate the hearing aid 100-1. When calibrating the hearing aid 100-1, the distances from the vocal cord to the first sound wave sensor 211 and the second sound wave sensor 221 may be determined, and the sensitivity of the second sound wave sensor 221 may be adjusted and/or configured accordingly.

In the audio device 100 in FIG. 3, whether increasing or decreasing the sensitivity of the second sound wave sensor 221 may also depend on the relative location between the audio device 100 and the target near-field sound source 140. When the position of the target near-field sound source 140 in FIG. 3 is located on the left side of the audio device 100, the sensitivity of the second sound wave sensor 221 may be reduced in order to allow the audio device 100 to suppress the target near-field sound wave. When the position of the target near-field sound source 140 in FIG. 3 is located on the right side of the audio device 100, the sensitivity of the second sound wave sensor 221 may be increased in order to allow the audio device 100 to suppress the target near-field sound wave. In addition, one of ordinary skill in the art would understand that adjusting the sensitivity of the second sound wave sensor 221 is essentially adjusting the output amplitude relationship between the second sound wave sensor 221 in response to the target near-field sound wave. Other adjustment methods that may achieve this purpose are also included within the scope of this application. For example, reducing the sensitivity of the first sound wave sensor 211, or simultaneously reducing the sensitivity of the first sound wave sensor 211 and increasing the sensitivity of the second sound wave sensor 221 may achieve the same effect as increasing the sensitivity of the second sound wave sensor 221 alone.

Figure 4:
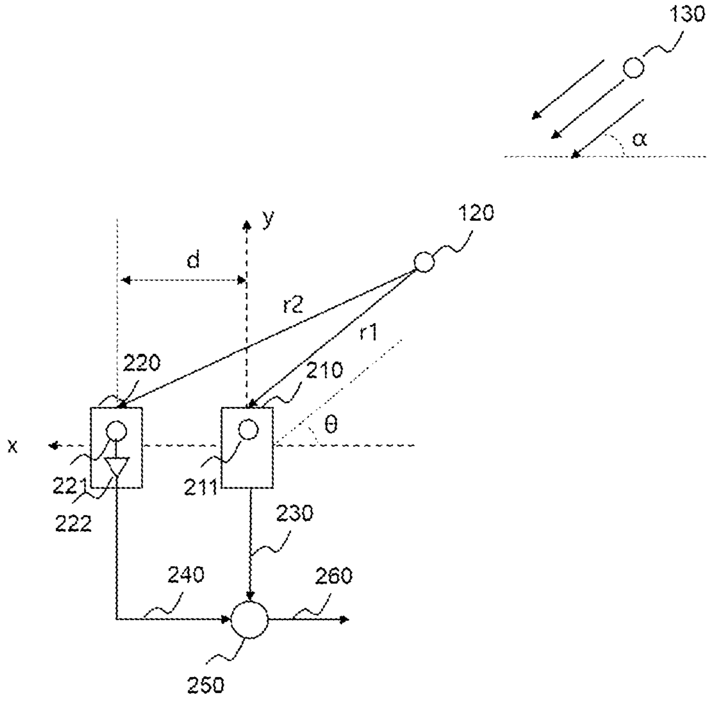
FIG. 4 is a schematic diagram of an audio device including an amplitude adjustment circuit according to some embodiments of the present application.

FIG. 4 is a schematic diagram of an audio device including an amplitude adjustment circuit according to some embodiments of the present application. FIG. 4 shows another method of adjusting the coefficient B. When the sensitivities of the first sound wave sensor 211 and the second sound wave sensor 221 are the same, the method of adjusting the coefficient B may also include adding an amplitude adjustment circuit to the first sound wave sensor module 210 and/or the second sound wave sensor module 220. Taking the embodiments shown in FIG. 4 as an example, the second sound wave sensor module 220 may include an amplitude adjustment circuit 222 connected after the second sound wave sensor 221. The second initial signal output by the second sound wave sensor 221 may be further modified by the amplitude adjustment circuit 222 before sending out the second signals. The adjustment (i.e., the coefficient B) on the second initial signal by the amplitude adjustment circuit 222 may be configured according to the respective distances between the target near-field sound source 140 and the two sensors. For example, when the audio device 100 is configured to cancel the response to the target near-field sound wave, the adjustment amplitude B may be $$\frac{r_2}{r_1}.$$

When it is desired to retain a portion of the response to the target near-field sound source 140, the adjustment amplitude B may be adjusted in the vicinity of $$\frac{r_2}{r_1}.$$

The adjustment of the second initial signals by the amplitude adjustment circuit 222 may include an amplitude gain and/or amplitude suppression. In FIG. 4, when the target near-field sound source 140 is located on the left side of the audio device 100, the amplitude adjustment circuit 222 may need to reduce the amplitude of the second initial signal so that the generated second signal match the amplitude of the first signal.

In some embodiments, the adjustment B of the amplitude adjustment circuit 222 is dynamically variable and/or adjustable in real-time. For example, in some non-hearing aid types of implementation scenarios, the position of the target near-field sound source 140 may be dynamically changed, and the distances of the target near-field sound source 140 to the two sensors are accordingly dynamically changed. Taking the case of completely eliminating the response to target near-field sound wave as an example, if the value of the coefficient B is $$\frac{r_2}{r_1},$$

then the value of B may need to adapt to the changes of $r_1$ and $r_2$ in real-time to ensure that the audio device 100 always maintain suppressing the target near-field sound source 140. Specifically, when the position of the target near-field sound source 140 is changed, the values of $r_1$ and $r_2$ change accordingly, and the amplitudes of the corresponding first initial signals and the amplitudes of the second initial signals may also change in real-time. The amplitude adjustment circuit 222 may adjust the adjustment B according to the change in the amplitude of the first initial signals and the amplitude of the second initial signals.

In some embodiments, the amplitude adjustment circuit 222 may also be disposed in the first sound wave sensor module 210 or in both the first sound wave sensor module 210 and the second sound wave sensor module 220. The mechanism of amplitude adjustment may be the same as that of the embodiments shown in FIG. 4. In some embodiments, the amplitude adjustment circuit 222 may be arranged independent from the first sound wave sensor module 210 and/or the second sound wave sensor module 220.

Figure 5:
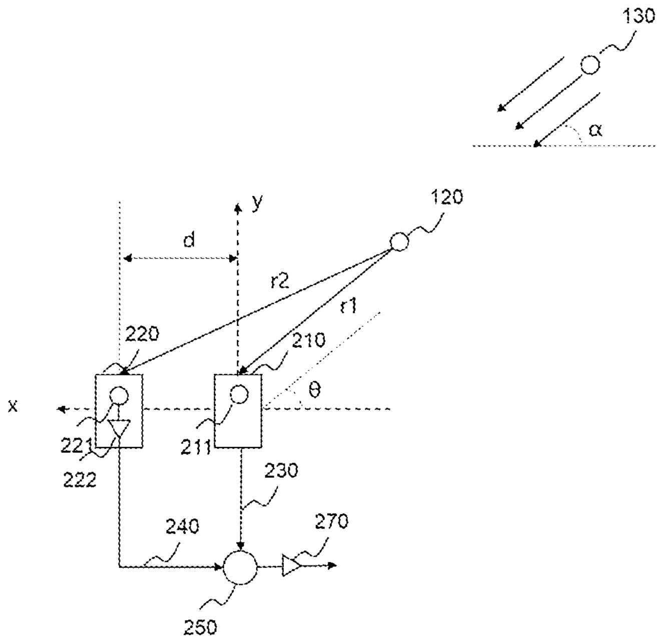
FIG. 5 is a schematic diagram of an audio device including a signal amplification circuit according to some embodiments of the present application.

FIG. 5 is a schematic diagram of an audio device including a signal amplification circuit according to some embodiments of the present application. In the audio device 100 for near-field signal suppression, the amplitude of the overall output signals is reduced due to a differential processing of the first signals and the second signals, which include the output signals in response to both the target near-field sound wave and the target far-field sound wave. In order to compensate for the signal loss, the audio device 100 may further include a signal amplification circuit 270. The signal amplification circuit 270 may be coupled to the signal processing circuit 250 (e.g., including the differential circuit) to amplify the signals generated by the signal processing circuit 250. In addition, connecting the signal amplifying circuit 270 after the differential circuit may increase the sensitivity of the audio device 100 to the target far-field sound source 150. When the audio device 100 is used in the hearing aid 100-1, it would be advantageous for the user to hear the sound far away. In some embodiments, the signal amplification circuit 270 may be integrated into or as part of the signal processing circuit 250. In some embodiments, the signal amplification circuit 270 may be arranged independent from the signal processing circuit 250. In some embodiments, the signal amplification circuit may also be disposed before the signal processing circuit 250, located in circuits 230 or 240.

Figure 6:
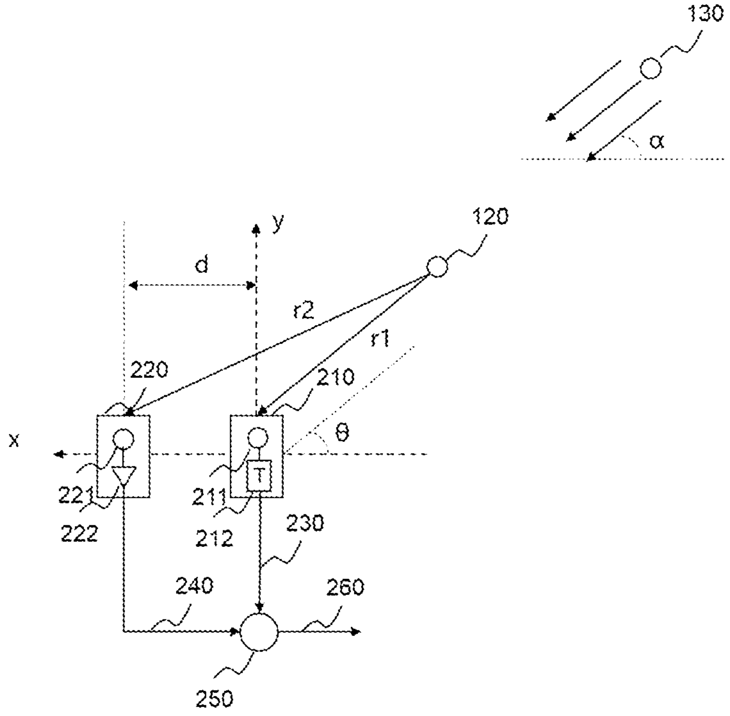
FIG. 6 is a schematic diagram of an audio device including a phase adjustment circuit according to some embodiments of the present application.

FIG. 6 is a schematic diagram of an audio device including a phase adjustment circuit according to some embodiments of the present application. According to the previous analysis, the influence of the phase difference may be ignored when the sound source frequency is low, such as in the case of human voice. However, in order to increase the implementation scenarios of the audio device 100, a phase adjustment circuit may be added to the first sound wave sensor module 210 and/or the second sound wave sensor module 220 to eliminate or reduce a phase difference between the target near-field sound wave at the first sound wave sensor 211 and the target near-field sound wave at the second sound wave sensor 221. Taking FIG. 6 as an example, the first sound wave sensor module 210 may further include a phase adjustment circuit 212 connected between the first sound wave sensor 211 and the signal processing circuit 250.

The time at which the target near-field sound wave emitted from the target near-field sound source 140 reaches the first sound wave sensor 211 is $$T = \frac{r_2 - r_1}{c}$$

seconds earlier than the time the target near-field sound wave reaches the second sound wave sensor 221. When the audio device 100 is configured to completely eliminate the response to the target near-field sound wave, the phase adjustment circuit 212 may be configured to delay the first initial signals by T seconds and output the delayed first initial signals as the first signals. Thus, the phase difference caused by the time difference when the target near-field sound wave arrives at the second sound wave sensor 221 and the first sound wave sensor 211 may be completely compensated.

In some embodiments, the delay of the first initial signal provided by the phase adjustment circuit 212 may also be further adjust by about T seconds, so as to render the audio device 100 the capability of partial suppression of the output signal in response to the target near-field sound wave, thereby retaining the response to at least a portion of the target near-field sound wave. In some embodiments, the phase adjustment circuit 212 may also be included in the second sensor array module 210 or in both the first sound wave sensor module 210 and the second sound wave sensor module 220. In some embodiments, the phase adjustment circuit 212 may be independent from the first sound wave sensor module 210 and/or the second sound wave sensor module 220.

Figure 7:
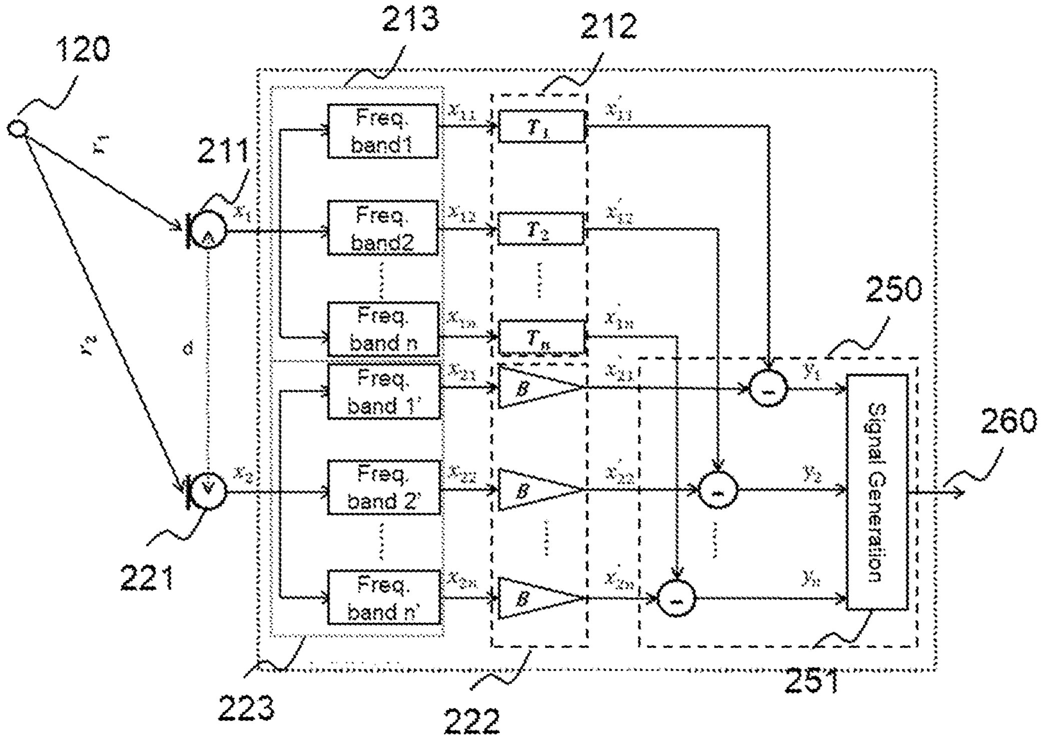
FIG. 7 is a schematic diagram of an audio device including a sub-band decomposition module according to some embodiments of the present application.

FIG. 7 is a schematic diagram of an audio device including a sub-band decomposition module according to some embodiments of the present application. In FIG. 6, when the phase adjustment circuit 212 is used to delay the first initial signals by T seconds, the output signals in response to the target near-field sound wave may be completely cancelled. In some cases where the output signals in response to the target near-field sound source 140 are desired to be partially canceled, the delay generated by the phase adjustment circuit 212 may be slightly longer or shorter than T seconds. In this case, the phase adjustment circuit 212 may be configured to generate different delays for target near-field sound waves with different frequencies. Since sound travels at constant speed in the air regardless of its frequency, the time difference Δt of the high and low frequency sound waves transmitted from the target near-field sound source 140 to the two sensors is fixed. The phase difference $\Delta\phi=\omega^*\Delta t$. Therefore, as the sound frequency increases, the phase difference of the first sound wave sensor 211 and the second sound wave sensor 221 responding to the target near-field sound wave gradually increases, accordingly, the difference between the first signal and the second signal also increases. This may affect the suppression effect on the signal of the target near-field sound source 140. Therefore, to achieve a balanced frequency response, a sub-band decomposition module may be added to the first sound wave sensor module 210 and the second sound wave sensor module 220 to decompose the first initial signal and the second initial signal each into a plurality of sub-bands. Then an independent phase adjustment circuit is respectively provided to each of the sub-frequency band to ensure that the phase difference of the output signals of the two modules are the same for each frequency band.

In the embodiments shown in FIG. 7, a sub-band decomposition module 213 is added to the first sound wave sensor module 210 to decompose the first initial signal output by the first sound wave sensor 211 into a plurality of frequency bands. Similarly, a sub-band decomposition module 223 added to the second sound wave sensor module 220 may decompose the second initial signal into a plurality of frequency bands according to the same decomposition method of the self-band decomposition module 213. In the first sound wave sensor module 210, the phase adjustment circuit 212 has a separate phase adjustment sub-circuit for each frequency band, and these phase adjustment sub-circuits may independently apply different degrees of delay $T_n$ to the signals of each frequency band, wherein n Indicates the serial number of the frequency band. The amplitude adjustment circuit 222 may also set an amplitude adjustment sub-circuit for each frequency band, and perform amplitude adjustment on the output signals of each frequency band, and the degrees (e.g., values) of adjustment are the same. The signal processing circuit 250 may be provided with separate differential circuits for each frequency band with each differential circuit corresponding to a signal output from the first sound wave sensor module 210 and a signal output by the second sound wave sensor module 220 in a certain frequency band. The signal processing circuit 250 may further include a signal synthesizing circuit 251 that synthesizes the output signals of each of the differential circuits and outputs them as an output signal of the audio device 100.

Taking the response signal of the first sound wave sensor 211 as an example, if the phase difference of the nth frequency band is set to be $\Delta\phi_n$, the first sound wave sensor 211 and the second sound wave sensor 221 respectively respond to the output signal $x_{1n}$, $x_{2n}$ of the nth frequency band of the target near-field sound source 140. The phases of $x_{1n}$, $x_{2n}$, are:

$$\Phi_1=\omega_n^*\left(\frac{r_1}{c}+T_n\right),\ \Phi_2=\omega_n^*\left(\frac{r_2}{c}\right) \tag{3}$$

The phase difference is:

$$\Delta\Phi_n-\omega_n^*\left(\frac{r_1}{c}+T_n\right)-\omega_n^*\left(\frac{r_2}{c}\right) \tag{4}$$

It may be seen from the above equation that the delay corresponding to different frequency bands n should be set as:

$$T_n=\frac{r_2}{c}-\frac{r_1}{c}+\frac{\Delta\Phi_n}{\omega_n} \tag{5}$$

$\Delta\phi_n$ varies with the range of [0, π], the smaller the phase difference Δϕ, the better the suppression effect of the audio device 100 on the signal from the target near-field sound source 140. For each frequency band, $\Delta\phi_n$ may take the same value, and the delay time $T_n$ of the corresponding phase adjustment sub-circuit for the signal may be different because the frequencies corresponding to the frequency bands are different. This method of separately adjusting the signal delay for different frequency bands may make the suppression effect for the reference sound source signal in the output signal equal for each frequency band.

Returning to the device application scenario shown in FIG. 1, the audio device 100 may be applied to similar head-wearable electronic devices, in addition to the hearing aid 100-1, it may be applied to, such as bone conduction earphones, and other earphones having a sound collection function, etc.

The device 110 may also be provided with a distance adjusting device for adjusting the distance between the first sound wave sensor 211 and the second sound wave sensor 221 to enhance the adaptability of the audio device to sound sources of different frequencies.

The head-wearable electronic device may include an in-ear hearing aid, and the in-ear hearing aid may include at least one earplug. An audio device 100 may be disposed in at least one of the earplugs, and the first sound wave sensor 211 and the second sound wave sensor 221 are disposed in at least one earplug.

In some embodiments, at least one of the earplugs may further include at least one signal converter that may receive the output signal of the audio device 100 (e.g., through a circuit 260, and an interface disposed on the base 200) and output a signal perceivable by the human cochlea. In some embodiments, the signal that the human cochlear may perceive may be a sound signal, and the signal converter may be a speaker. In some embodiments, the human cochlear-perceivable signal may be a bone conduction signal, and the signal converter may convert the electrical signal output by the audio device 100 into a vibrational signal that is transmitted to the cochlea through the wearer's facial bone.

In some embodiments, an adapting button may also be provided on the device 110. When the adapting button is pressed, the amplitude adjustment circuit 222 may adjust the amplitude adjustment according to the first initial signal currently output by the first sound wave sensor 211 and the second initial signal currently output by the second sound wave sensor 221 (see the mechanism shown in FIG. 3 and related descriptions). In the case of a hearing aid, for example, different wearers may have different distances from the vocal cord to the ear, and the ear is usually the wearing position of the hearing aid. If the amplitude adjustment of the amplitude adjustment circuit 222 cannot be adjusted by the user, the wearer must have a fitting test in order to determine the adjustment range of the amplitude adjustment circuit 222 according to the position of the vocal cord, which is disadvantageous for mass production of the hearing aid. However, if such an adapting button can be provided, the manufacturer may mass produce the hearing aids, and the user may perform the adaptation operation after receiving the product. For example, after wearing the hearing aid, the user may press the adapting button and speak in a relatively quiet environment, the sound source position would be the wearer's vocal cord position. The amplitude adjustment will be determined by the amplitude adjustment circuit 222 dedicated to the wearer. When the hearing aid is used by another wearer, it may also be adapted to that wearer through the same method, which renders the hearing aid to be sharable between different users. The bone conduction technology is especially useful in the field of hearing aids, as compared with the ordinary in-ear hearing aids. Since the in-ear hearing aid needs to be customized for the human ear canal structure, it is not easy to be shared. While the bone conduction technique does not require a special fit for the human ear canal structure and thus may be worn by anyone without adaption.

When the audio device 100 is applied to similar smart television 112 and smart speaker 113, such smart devices typically include a speaker. When the user applies a control command to such a smart device through a voice command, the user's sound source is far away from the device, while the position of the speaker is relatively close, thus the sound of the speaker may drown out the user's voice, which may interfere with recognizing the user's voice commands. Therefore, after the audio device 100 is provided, the smart device may better recognize a faraway voice, thereby enhancing the ability to recognize the user's voice commands. In such devices, the speaker is the target near-field sound source 140, which is fixedly positioned relative to the device.

Figure 8A:
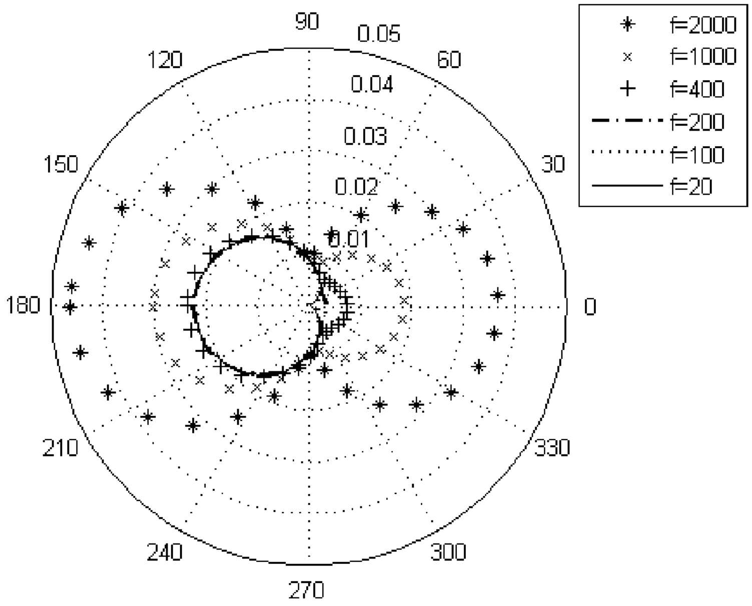
FIGS. 8A and 8B are schematic diagrams showing responses of an audio device to a target near-field sound source and a target far-field sound source at different directions according to some embodiments of the present application.
Figure 8B:
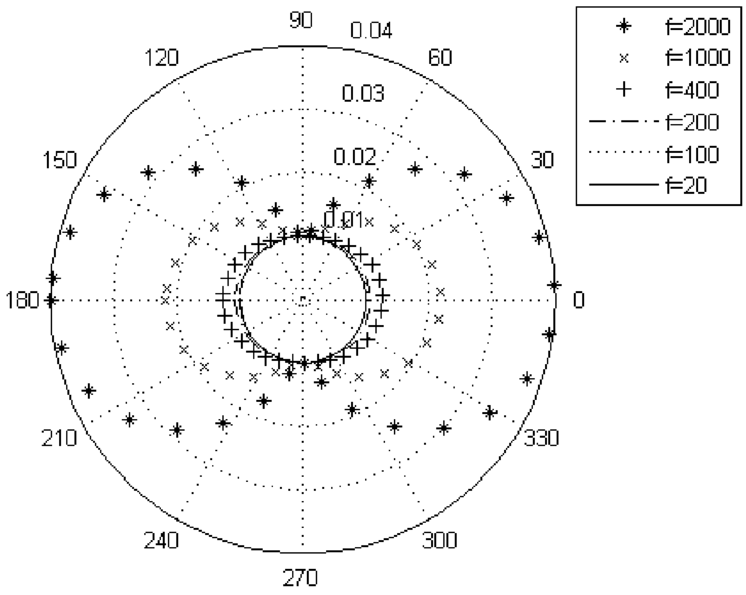

FIGS. 8A and 8B are schematic diagrams showing the direction response of the audio device in the present application to a target near-field sound source (near-field) and a target far-field sound source (far-field). Taking the hearing aid as an example, the distance r1 and r2 between the vocal cord of the wearer and the two sensors may be determined in advance, and the coefficient B may also be determined accordingly. In the embodiment shown in FIG. 3, r2 may be expressed by the distance between the sound source and the first sound wave sensor 211, the distance d between the sensors, and the angle θ between the sound source and the first sound wave sensor 211: $r2=\sqrt{(r_1^2+d^2+2*r_1\times d\times\cos\theta)}$.

The target near-field sound source signal suppression effects shown in FIGS. 8A and 8B are obtained under the following conditions: the sound source signal is a pure sound having a frequency range of 0 to 2000 Hz, the sound pressure of the target near-field sound source 140 and the target far-field sound source 150 at the first sound wave sensor 211 P1=1 Pa, taking R=1 m, d=0.01 m, r1=0.1 m, then r2=0.11 m, B=1.1.

The embodiments corresponding to FIGS. 8A and 8B are shown in FIG. 4. The amplitude adjustment circuit 222 only includes the function of amplitude gain, and the first sound wave sensor module 210 does not include the phase adjustment function. The concentric circles in FIGS. 8A and 8B indicate the amplitude of the signal, and the amplitude of the output signal on the outer side is larger than at on the inner side. In FIG. 8A, in the case of a low frequency (f=400 or less), the audio device 100 has a significant suppression effect on the target near-field sound source signal having a θ of −90° to 90°. It will be appreciated that similar effects may be achieved in the range of 90° to −90° when the amplitude adjustment circuit may attenuate the signal. In FIG. 8B, the audio device 100 does not have a suppressing effect on the target far-field sound source 150 compared to the target near-field sound source 140.

Figure 9A:
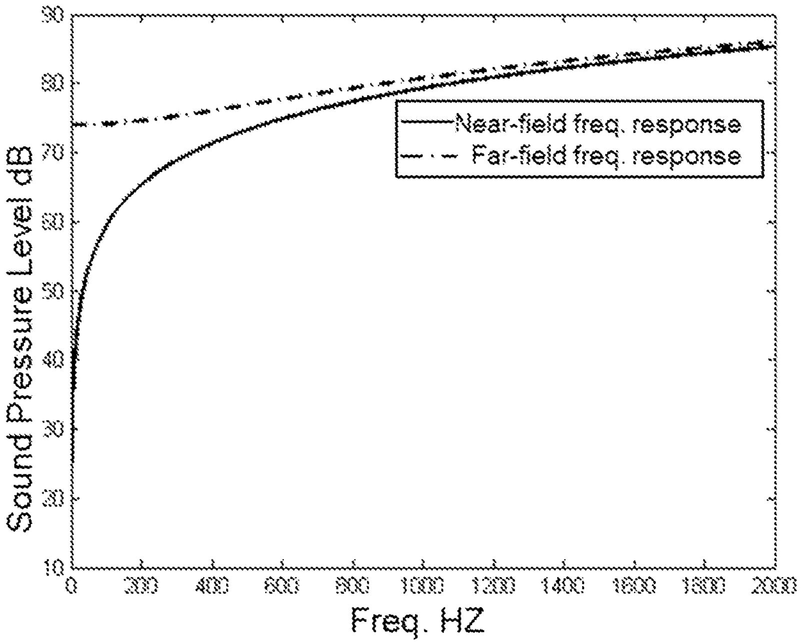
FIGS. 9A, 9B, and 9C are schematic diagrams of frequency responses of an audio device at 0° direction according to some embodiments of the present application.
Figure 9B:
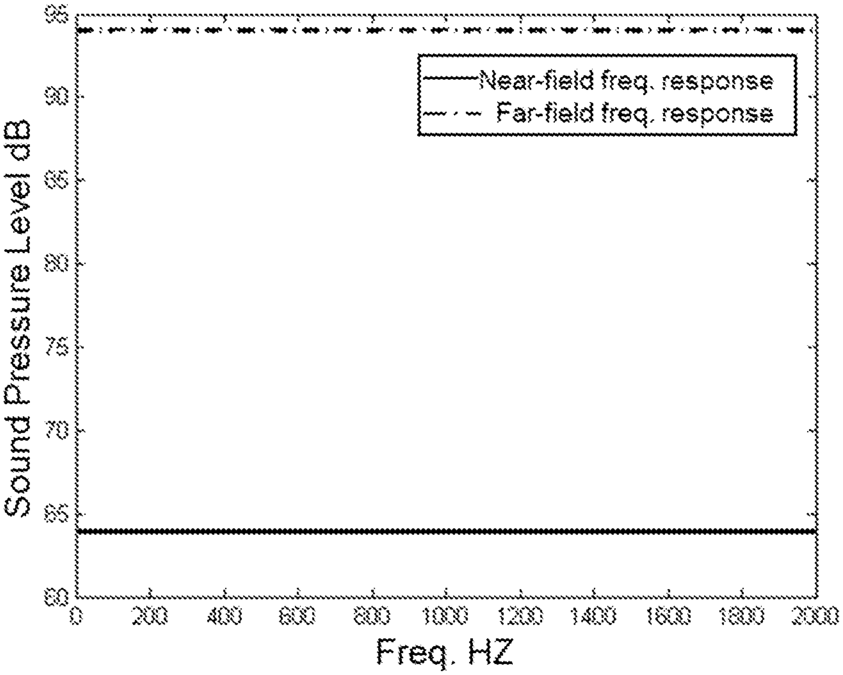
Figure 9C:
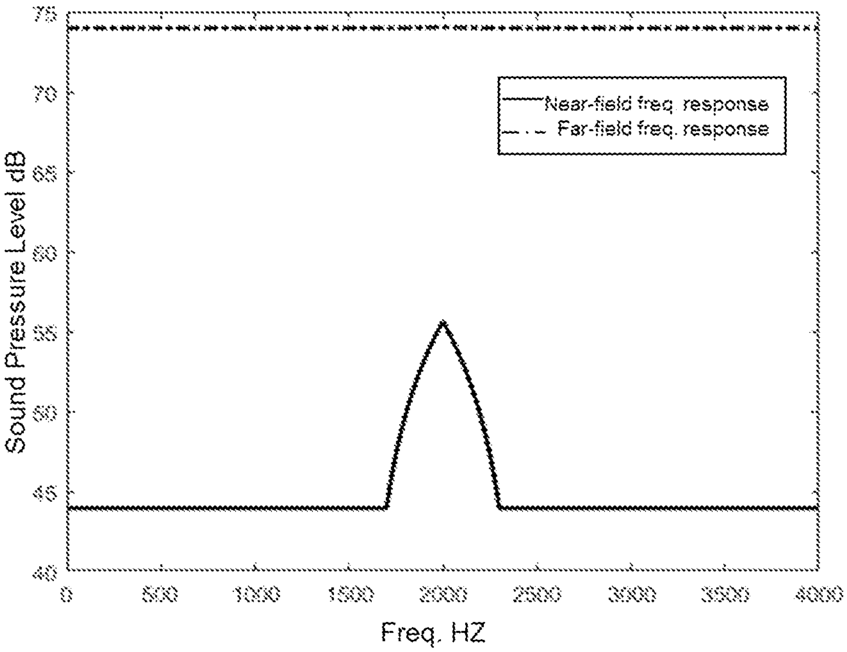

FIGS. 9A, 9B, and 9C are schematic diagrams 0° direction frequency response in different embodiments of the audio device according to the present application. FIG. 9A corresponds to the embodiment shown in FIG. 3, and FIG. 9B corresponds to the embodiment shown in FIG. 6. The horizontal axes in FIGS. 8A and 8B represent the frequency of the sound source signal, and the vertical axes represent the intensity of the output signal from the audio device 100.

In FIG. 9A, when the frequency is low (e.g., about 400 Hz), the response of the audio device 100 to the target near-field sound source 140 (i.e., the near-field sound source in the figure) is substantially lower than that to the target far-field sound source 150 (i.e., the far-field sound source in the figure). The lower the sound source frequency, the better the suppression effect of the audio device 100 on the target near-field sound source signal.

In FIG. 9B, since the phase adjustment sub-circuit may apply different delays for different frequency bands, the phase difference of the output signals of each frequency band of the two sensors may be stable, rather than vary with changes in the frequency. Therefore, in FIG. 9B, the audio device 100 may maintain the suppression effect on the target near-field sound source signal over a wider frequency range.

In FIG. 9C, it is shown that the output signal amplitude of the audio device for different frequency bands may be adjusted as needed. The phase difference $\Delta\phi_n$ of the two sensors for different frequency bands may be changed by changing the delay Tn of a specific frequency band, thereby changing the amplitude of the output signal of different frequency bands. In FIG. 9C, the phase difference of each frequency band from 0 Hz to 1700 Hz and above 2300 Hz is $\Delta\phi_{1n}=\pi/1000$, the phase difference in the 2000 Hz band is $\Delta\phi_{2n}=\pi/200$, and the corresponding band delay may be obtained according to the formula $T_n=r2/c-r1/c+(\Delta\phi_n)/\omega_n$. It may be seen that a desired frequency response curve may be obtained by means of changing the delay as needed.

Features of the present disclosure, as well as operations and functions of related elements of the structure, and the economic efficiency of the combination and manufacture of the components, may be substantially improved. All of these form part of the present disclosure with reference to the drawings. However, it should be clearly understood that the drawings are only for the purpose of illustration and description, and are not intended to limit the scope of the present disclosure. It is also understood that the drawings are not drawn to scale.

In view of the foregoing, it will be understood by those skilled in the art that although not explicitly stated herein, those skilled in the art will understand that the present application is intended to cover various changes, improvements, and modifications of the embodiments. These changes, modifications, and improvements are intended to be made by the present disclosure and are within the spirit and scope of the exemplary embodiments of the present disclosure.

The terminology used herein is for the purpose of describing particular exemplary embodiments only and is not intended to be limiting. As used herein, the singular forms "a", "an" and "the" may include their plural forms as well, unless the context clearly indicates otherwise. When used in this disclosure, the terms "comprises", "comprising", "includes" and/or "including" refer to the presence of stated features, integers, steps, operations, elements, components and/or groups, but do not preclude the presence or addition of one or more other features, integers, steps, operations, elements, components, and/or groups. As used in this disclosure, the term "A on B" means that A is directly adjacent to B (from above or below), and may also mean that A is indirectly adjacent to B (i.e., there is some element between A and B); the term "A in B" means that A is all in B, or it may also mean that A is partially in B.

In addition, some of the terms in this application have been used to describe embodiments of the present disclosure. For example, "one embodiment", "an embodiment" and/or "some embodiments" means that a particular feature, structure or characteristic described in connection with the embodiment may be included in at least one embodiment of the present disclosure. Therefore, it should be emphasized and understood that in various parts of the present disclosure, two or more references to "an embodiment" or "one embodiment" or "an alternate embodiment" are not necessarily referring to the same embodiment. Furthermore, the particular features, structures, or characteristics may be combined as appropriate in one or more embodiments of the present disclosure.

It should be understood that in the description of the embodiments of the present disclosure, to assist in understanding a feature and for the purpose of simplifying the present disclosure, sometimes various features may be combined in a single embodiment, or drawings, description thereof. Alternatively, various features may be described in different embodiments of the present application. However, this is not to say that a combination of these features is necessary, and it is entirely possible for those skilled in the art to understand that a part of these features may be extracted as a separate embodiment. That is to say, the embodiments in the present application may also be understood as the integration of a plurality of secondary embodiments. It is also true that the content of each of the sub-embodiments is less than all of the features of a single previously disclosed embodiment.

In some embodiments, numbers expressing quantities or properties used to describe or define the embodiments of the present application should be understood as being modified by the terms "about," "approximate," or "substantially" in some instances. For example, "about", "approximately" or "substantially" may mean a ±20% change in the described value unless otherwise stated. Accordingly, in some embodiments, the numerical parameters set forth in the written description and the appended claims are approximations, which may vary depending upon the desired properties sought to be obtained in a particular embodiment. In some embodiments, numerical parameters should be interpreted in accordance with the value of the parameters and by applying ordinary rounding techniques. Although a number of embodiments of the present application provide a broad range of numerical ranges and parameters that are approximations, the values in the specific examples are as accurate as possible.

Each of the patents, patent applications, patent application publications, and other materials, such as articles, books, instructions, publications, documents, products, etc., cited herein are hereby incorporated by reference, which are applicable to all contents used for all purposes, except for any history of prosecution documents associated therewith, any identical, or any identical prosecution document history, which may be inconsistent or conflicting with this document, or any such subject matter that may have a restrictive effect on the broadest scope of the claims associated with this document now or later. For example, if there is any inconsistent or conflicting in descriptions, definitions, and/or use of a term associated with this document and descriptions, definitions, and/or use of the term associated with any materials, the term in this document shall prevail.

Finally, it should be understood that the embodiments of the application disclosed herein are merely described to illustrate the principles of the embodiments of the application. Other modified embodiments are also within the scope of this application. Therefore, the embodiments disclosed herein are by way of example only and not limitations. Those skilled in the art may adopt alternative configurations to implement the invention in this application in accordance with the embodiments of the present application. Therefore, the embodiments of the present application are not limited to those embodiments that have been precisely described in this disclosure.

What is claimed is:

1. An audio device for sound transmission, comprising:

a head mounted electronic device;

a first sound wave sensor, mounted on the electronic device, to receive a sound wave and output a first signal based on the sound wave;

a second sound wave sensor, mounted on the electronic device, to receive the sound wave and output a second signal based on the sound wave; and a signal processing circuit coupled to the first sound wave sensor and the second sound wave sensor to generate an output signal based on the first signal and the second signal, wherein a target near-field sensitivity of the audio device to a target near-field sound wave emitted by a target near-field sound source is substantially lower than a far-field sensitivity of the audio device to a far-field sound wave emitted by a far-field sound source, and wherein a second target distance of the target near-field sound source from the first sound wave sensor is shorter than a first target distance of the far-field sound source from the first sound wave sensor.

2. The audio device according to claim 1, wherein the target near-field sensitivity being substantially lower than the far-field sensitivity is that a ratio of the target near-field sensitivity to the far-field sensitivity is lower than a predetermined value.

3. The audio device according to claim 1, wherein the first sound wave sensor includes a first microphone;

the second sound wave sensor includes a second microphone; and a distance from the first microphone to the second microphone is a predetermined distance.

4. The audio device according to claim 3, wherein the target near-field sound source is positioned such that an absolute value of a sound pressure amplitude gradient of the target near-field sound wave between the first microphone and the second microphone is greater than a first sound pressure threshold; and the target far-field should source is positioned such that an absolute value of a sound pressure amplitude gradient between a sound pressure amplitude of the target far-field sound wave between the first microphone and the second microphone is less than a second sound pressure threshold.

5. The audio device according to claim 1, wherein:

when the electronic device is in operation, a position of the target near-field sound source has a fixed relationship with a spatial pose of the electronic device, the first sound wave sensor is at a first distance from a position of the target near-field sound source, and the second sound wave sensor is at a second distance from the position of the target near-field sound source.

6. The audio device according to claim 5, wherein a sensitivity of the first sound wave sensor is a first sensitivity, a sensitivity of the second sound wave sensor is a second sensitivity, and the first sensitivity and the second sensitivity are determined according to a ratio of the first distance to the second distance.

7. The audio device according to claim 5, wherein a sensitivity of the first sound wave sensor is a first sensitivity, a sensitivity of the second sound wave sensor is a second sensitivity, and the first sensitivity is equal to the second sensitivity.

8. The audio device according to claim 5, wherein the second sound wave sensor further includes an amplitude adjustment circuit configured to perform an amplitude adjustment on an initial second signal output by the second sound wave sensor according to a ratio of the first distance to the second distance to generate the second signal.

9. The audio device according to claim 8, wherein the electronic device includes an adapting button configured to activate the amplitude adjustment circuit when pressed.

10. The audio device according to claim 8, wherein when the audio device is in operation, a value of amplitude adjustment of the amplitude adjustment circuit changes in real time according to dynamic changes of the first distance and the second distance.

11. The audio device according to claim 5, wherein the first sound wave sensor includes a phase adjustment circuit configured to perform a phase adjustment on an initial first signal output by the first sound wave sensor according to a difference between the first distance and the second distance to generate the first signal.

12. The audio device according to claim 1, wherein the signal processing circuit includes a differential circuit.

13. The audio device according to claim 12, further comprising a signal amplifying circuit to amplify an output signal of the differential circuit to generate an output signal of the audio device.

14. The audio device according to claim 5, wherein a preset distance between the second sound wave sensor and the first sound wave sensor is adjustable.

15. The audio device according to claim 1, wherein the head mounted electronic device includes a hearing aid, and the hearing aid includes at least one earplug, at least part of the first sound wave sensor and at least part of the second sound wave sensor are disposed in the at least one earplug.

16. The audio device according to claim 15, wherein each of the at least one earplug includes at least one signal converter, the at least one signal converter each is configured to receive the output signal from the signal processing circuit and output a sound signal transmitted through air.

17. The audio device according to claim 15, wherein the at least one earplug each includes at least one signal converter, the at least one signal converter each is configured to receive the output signal from the signal processing circuit and output a bone-conducted sound signal.

18. The audio device according to claim 5, wherein the electronic device includes a speaker, and the position of the target near-field sound source is a mounting position of the speaker.

19. The audio device according to claim 1, wherein the first signal includes n first sub-signals, the second signal includes n second sub-signals, wherein the $i^{th}$ first sub-signal and the $i^{th}$ second sub-signal correspond to the same frequency band, wherein n is a positive integer greater than 1, and i is any integer from 1 to n;

the signal processing circuit processes each pair of the first sub-signal and the second sub-signal having the same order number and then synthesizes the output signal.

* * * * *